(12) United States Patent
Okada (10) Patent No.: US 9,594,966 B2
(45) Date of Patent: Mar. 14, 2017

(54) OBSTACLE DETECTION DEVICE AND OBSTACLE DETECTION METHOD

(71) Applicant: Sharp Kabushiki Kaisha, Osaka-shi, Osaka (JP)

(72) Inventor: Kazuhisa Okada, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/760,760

(22) PCT Filed: Dec. 17, 2013

(86) PCT No.: PCT/JP2013/083724
§ 371 (c)(1),
(2) Date: Jul. 14, 2015

(87) PCT Pub. No.: WO2014/129064
PCT Pub. Date: Aug. 28, 2014

(65) Prior Publication Data
US 2015/0356358 A1     Dec. 10, 2015

(30) Foreign Application Priority Data

Feb. 21, 2013  (JP) ................................. 2013-031979

(51) Int. Cl.
*G06K 9/00* (2006.01)
*G06T 7/00* (2006.01)
(Continued)

(52) U.S. Cl.
CPC ......... *G06K 9/00805* (2013.01); *G01C 3/085* (2013.01); *G06T 7/0075* (2013.01);
(Continued)

(58) Field of Classification Search
CPC .......................... G06K 9/00805; G08G 1/166
See application file for complete search history.

(56) References Cited

U.S. PATENT DOCUMENTS 5,719,954 A * 2/1998 Onda ..................... G06K 9/20
356/611
7,437,244 B2 * 10/2008 Okada ................... G08G 1/166
348/155

(Continued)

FOREIGN PATENT DOCUMENTS

JP       05-114099 A     5/1993
JP     2013-174494 A    9/2013

OTHER PUBLICATIONS

Official Communication issued in International Patent Application No. PCT/JP2013/083724, mailed on Mar. 18, 2014.

*Primary Examiner* — Oneal R Mistry
(74) *Attorney, Agent, or Firm* — Keating & Bennett, LLP (57) ABSTRACT

By a disparity computation unit 21, first, with respect to a block in a bottom row of a first image, a corresponding block within a second image which has a same Y-coordinate as a Y-coordinate of the block and in which an object same as or similar to an object appearing in the block appears is searched for, and, next, in the case of searching for, with respect to a block which is upward in order from the searched block of the first image, a corresponding block within the second image in which an object same as or similar to that of the block appears, the corresponding block within the second image which has a same Y-coordinate as a Y-coordinate of the block of the first image and in which an object same as or similar to that of the block of the first image appears in an X-coordinate setting range with an X-coordinate of the corresponding block of the second image corresponding to the searched block which is immediately below the block of the first image as a center is searched for. Thus, provided is an obstacle detection device capable of simplifying processing for finding an obstacle, shortening a processing time and simplifying a hardware configuration.

3 Claims, 8 Drawing Sheets

(51) Int. Cl.
*G01C 3/08* (2006.01)
*G08G 1/16* (2006.01)

(52) U.S. Cl.
CPC ............... *G06T 2207/10012* (2013.01); *G06T 2207/30261* (2013.01); *G08G 1/166* (2013.01)

(56) References Cited

U.S. PATENT DOCUMENTS

| | | | | |
|---|---|---|---|---|
| 2006/0029272 | A1* | 2/2006 | Ogawa | G06K 9/32 382/154 |
| 2010/0128974 | A1* | 5/2010 | Koizumi | G06T 7/0075 382/154 |
| 2012/0327189 | A1* | 12/2012 | Muramatsu | G01C 3/06 348/46 |

* cited by examiner

OBSTACLE DETECTION DEVICE AND OBSTACLE DETECTION METHOD

TECHNICAL FIELD

This invention relates to an obstacle detection device and an obstacle detection method, and specifically relates to an obstacle detection device and an obstacle detection method for detecting roughness or an obstacle on a road surface from images captured by using a stereo camera.

BACKGROUND ART

In recent years, a measurement technology by which a vehicle exterior target sight is captured by a camera or the like mounted on a car and this captured image is subjected to image processing to obtain a distance from the car to a target object has been adopted as leading means (for example, refer to Japanese Unexamined Patent Application Publication No. 5-114099 (PTL 1)).

This distance measurement technology with an image is roughly classified into a technology by which a distance to a target object is estimated by using a relation with a camera position from a monocular image and a technology by which a distance to a target object is obtained by using triangulation principles from a plurality of images photographed by a plurality of cameras.

Among them, with the measurement technology by which a distance is obtained by using triangulation principles from a plurality of images, the distance is obtained from relative shift of positions of a same object in left and right images, so that it is possible to obtain the distance accurately.

CITATION LIST

Patent Literature

PTL 1: Japanese Unexamined Patent Application Publication No. 5-114099

SUMMARY OF INVENTION

Technical Problem

A method for performing control such as obtaining a distance from a car to a target object by using such a distance measurement technology with an image, predicting a risk of collision with a forward vehicle, a guardrail or the like, and applying the brakes thereto has been put into practical use.

On the other hand, vehicles regarded as pedestrians by limit required by a law include a mobility scooter and an electric-powered wheelchair, and the traveling number thereof is predicted to increase from this time with aging of society. These mobility scooter and electric-powered wheelchair need to be ones for which consideration to safety is made more because of a point that a driver is an elder or has a disability. Accordingly, it is urgently needed, for a mobility scooter and for an electric-powered wheelchair, to develop a method for estimating a risk by using a camera like for a car.

In the aforementioned electric-powered wheelchair, accidents including not merely collision with an obstacle such as a guardrail or a wall but falling down at a small step on a road surface have been reported, and in order to prevent them, it is necessary to detect not only a frontward obstacle but also a small obstacle or step on a road surface.

In the aforementioned distance measurement technology with an image, when obtaining a distance to an obstacle with a stereo camera, a position in a right image at which an obstacle appearing in a left image appears is searched for, disparity is computed from a difference of coordinates appearing in the left and right images, and a distance is computed from this disparity. Here, in order to discriminate an obstacle having a size of about 5 cm, which is on a road surface, a camera having a pixel number of 640×480 pixels at minimum is needed. When an obstacle which is 2 m ahead is photographed by the stereo camera with this pixel number, disparity of this obstacle between left and right cameras becomes about 60 pixels, so that a position of the right image at which the disparity is 0 to 60 pixels at minimum needs to be searched for with respect to a block of the left image in which the obstacle appears to search for a block in which the same obstacle appears. When the obstacle is at a closer position, the disparity becomes large, so that the search needs to be performed for a much wider range and a processing time and a scale of hardware are increased.

Thus, a problem to be solved by this invention is to provide an obstacle detection device and an obstacle detection method capable of simplifying processing for finding an obstacle and shortening a processing time as well as capable of simplifying a hardware configuration.

Solution to Problem

In order to solve the aforementioned problem, an obstacle detection device of this invention includes:
  a stereo camera;
  a disparity computation unit that computes, based on a first image and a second image photographed by the stereo camera, disparity of an object appearing in the first and second images; and
  an obstacle detection unit that obtains a distance to the object based on the disparity of the object appearing in the first and second images, which is computed by the disparity computation unit, to detect whether or not the object is an obstacle, in which
  lateral directions of the first and second images are set as X-coordinates and vertical directions of the first and second images are set as Y-coordinates, as well as the first image is divided into a plurality of blocks that are arrayed in a matrix shape, and
  the disparity computation unit
  searches for, with respect to a block in a bottom row of the first image, a corresponding block within the second image which has a same Y-coordinate as a Y-coordinate of the block and in which an object same as or similar to an object appearing in the block appears,
  next, in the case of searching for, with respect to a block which is upward in order from the searched block of the first image, a corresponding block within the second image in which an object same as or similar to that of the block appears, searches for the corresponding block within the second image which has a same Y-coordinate as a Y-coordinate of the block of the first image and in which the object same as or similar to that of the block of the first image appears in an X-coordinate setting range with an X-coordinate of the corresponding block of the second image corresponding to the searched block which is immediately below the block of the first image as a center, and
  computes disparity of the object appearing in the first and second images from a difference between an X-coordinate of the block of the first image and the X-coordinate of the corresponding block of the second image corresponding to the block.

Here, in the plurality of blocks of the first image which are arrayed in the matrix shape, a plurality of blocks which are arranged in a lateral direction are set as one row and a plurality of blocks which are arranged in a vertical direction are set as one column.

Moreover, in the obstacle detection device of one embodiment, the disparity computation unit computes a distance to a road surface which appears in the block in the bottom row of the first image based on a vertical view angle, a depression angle and a camera height of the stereo camera, computes disparity between the road surface which appears in the block in the bottom row of the first image and the road surface which is to appear in the second image based on the distance to the road surface which appears in the block in the bottom row of the first image, and searches for a corresponding block within the second image which has a Y-coordinate same as the Y-coordinate of the block in the bottom row of the first image and in which an object same as or similar to that of the block of the first image appears in the X-coordinate setting range with an X-coordinate obtained by subtracting the disparity from an X-coordinate of the block as a center.

Moreover, in the obstacle detection device of one embodiment, data of the first and second images is transferred one row by one row upwardly from a lower row from the stereo camera to the disparity computation unit, and the disparity computation unit, at a time when image data included in a block of one row of the first image and image data of the second image corresponding to the image data are prepared, searches for a corresponding block of the second image in which an object same as or similar to an object appearing in the block of the first image appears.

Moreover, in the obstacle detection device of one embodiment, data of the first and second images is transferred one column by one column in a leftward manner from a right column or one column by one column in a rightward manner from a left column from the stereo camera to the disparity computation unit, and the disparity computation unit, at a time when image data included in blocks of a plurality of columns of the first image and image data of the second image corresponding to the image data are prepared, searches for a corresponding block of the second image in which an object same as or similar to an object appearing in the block of the first image appears.

Moreover, in an obstacle detection method of this invention, the obstacle detection method has:

a disparity computation step of computing, based on a first image and a second image, which are photographed by a stereo camera, disparity of an object appearing in the first and second images by a disparity computation unit; and an obstacle detection step of obtaining a distance to the object based on the disparity of the object appearing in the first and second images, which is computed at the disparity computation step, to detect whether or not the object is an obstacle by an obstacle detection unit, in which lateral directions of the first and second images are set as X-coordinates and vertical directions of the first and second images are set as Y-coordinates, as well as the first image is divided into a plurality of blocks that are arrayed in a matrix shape, and the disparity computation step includes:

a first step of searching for, with respect to a block in a bottom row of the first image, a corresponding block within the second image which has a same Y-coordinate as a Y-coordinate of the block and in which an object same as or similar to an object appearing in the block appears, a second step of, next, in the case of searching for, with respect to a block which is upward in order from the searched block of the first image, a corresponding block within the second image in which an object same as or similar to that of the block appears, searching for the corresponding block within the second image which has a same Y-coordinate as a Y-coordinate of the block of the first image and in which an object same as or similar to that of the block of the first image appears in an X-coordinate setting range with an X-coordinate of the corresponding block of the second image corresponding to the searched block which is immediately below the block of the first image as a center, and a third step of computing disparity of the object appearing in the first and second images from a difference between an X-coordinate of the block of the first image and the X-coordinate of the corresponding block of the second image corresponding to the block, which are obtained at the first and second steps.

Advantageous Effects of Invention

As clear from above, according to this invention, by a disparity computation unit, first, with respect to a block in a bottom row of a first image, a corresponding block within a second image which has a same Y-coordinate as a Y-coordinate of this block and in which an object same as or similar to an object appearing in this block appears is searched for, and, next, in the case of searching for, with respect to a block which is upward in order from the searched block of the first image, a corresponding block within the second image in which an object same as or similar to that of this block appears, the corresponding block within the second image which has a same Y-coordinate as a Y-coordinate of the block of the first image and in which an object same as or similar to that of the block of the first image appears in an X-coordinate setting range with an X-coordinate of the corresponding block of the second image corresponding to the searched block which is immediately below the block of the first image as a center is searched for, thus making it possible to find an obstacle in a place where disparity is large only by searching a narrow range, so that a processing time when finding the obstacle becomes short as well as a scale of hardware performing searching processing becomes small.

DESCRIPTION OF EMBODIMENTS

Description will hereinafter be given in more detail for an obstacle detection device and an obstacle detection method of this invention with illustrated embodiments.

[First Embodiment]

Figure 1:
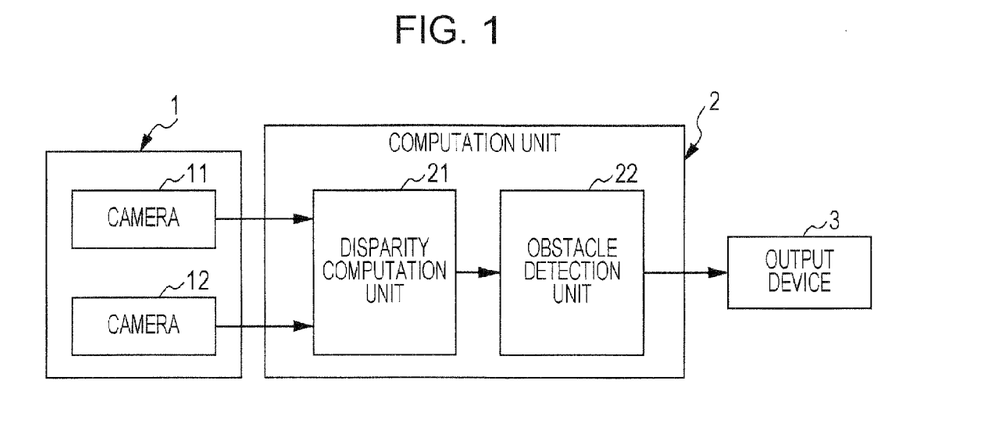
FIG. 1 is a block diagram of an obstacle detection device of a first embodiment of this invention.

FIG. 1 shows a block diagram of an obstacle detection device of a first embodiment of this invention.

This obstacle detection device of the first embodiment includes a camera unit 1 as one example of a stereo camera, a computation unit 2, and an output device 3 which outputs a computation result of the computation unit 2 as shown in FIG. 1. The camera unit 1 has two cameras 11 and 12 which are arranged on left and right at a predetermined interval with optical axes thereof in parallel. Moreover, the computation unit 2 has a disparity computation unit 21 to which image data of stereo images photographed by the two cameras 11 and 12 are input and which computes disparity of each site in the stereo images, and an obstacle detection unit 22 which detects an obstacle or a step based on the disparity computed by the disparity computation unit 21. The aforementioned obstacle detection unit 22 judges that there is an obstacle when a distance computed based on the disparity becomes a fixed distance or less.

Figure 2:
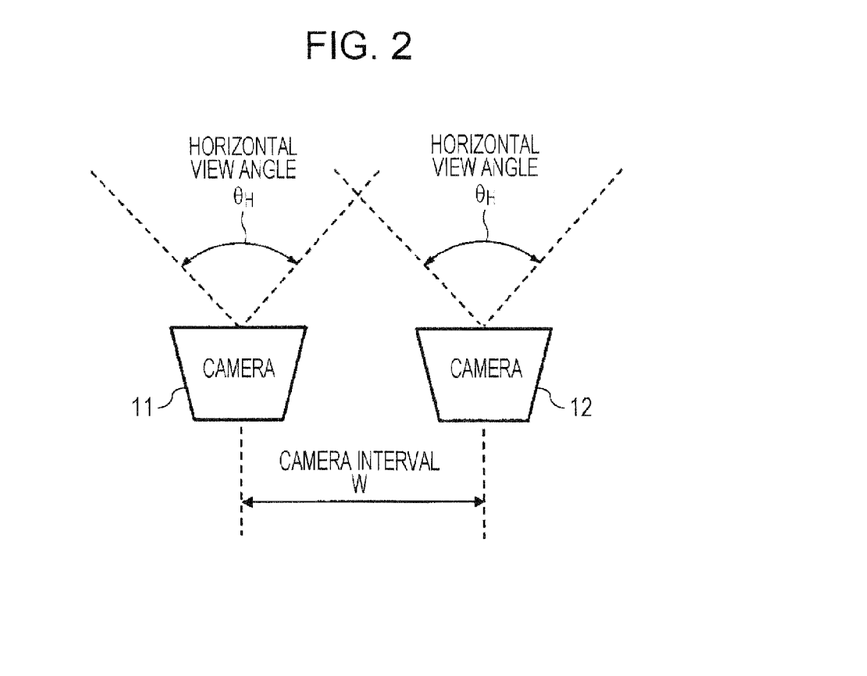
FIG. 2 is a view of a camera unit of the aforementioned obstacle detection device as seen from an upper side.
Figure 3:
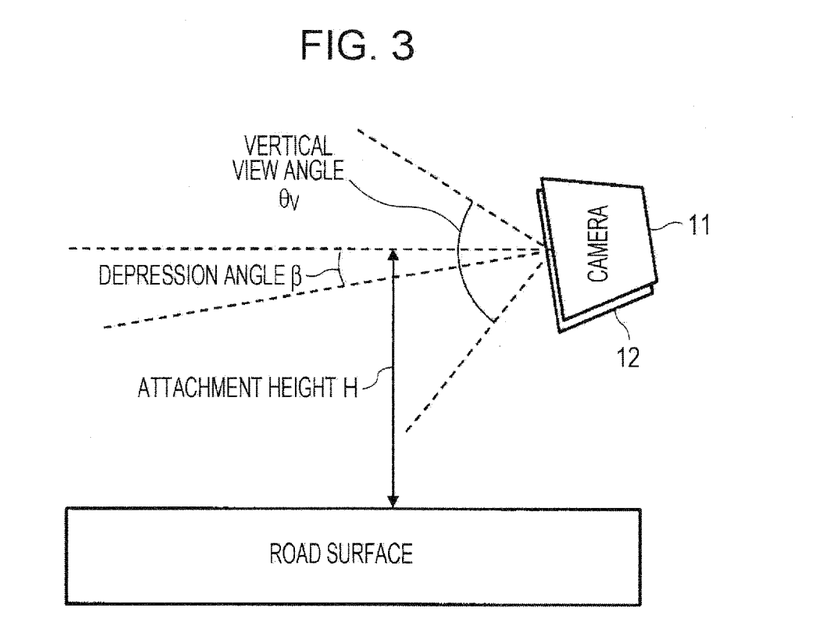
FIG. 3 is a view of the camera unit of the aforementioned obstacle detection device as seen from a lateral side.

FIG. 2 is a view of the camera unit 1 of the aforementioned obstacle detection device as seen from an upper side, and FIG. 3 is a view of the camera unit 1 of the aforementioned obstacle detection device as seen from a lateral side.

The two cameras 11 and 12 shown in FIG. 2 and FIG. 3 are installed on left and right of a front portion of a mobility scooter or an electric-powered wheelchair which is not shown. An interval between the optical axes of the left and right cameras 11 and 12 is set as a "camera interval W". A height, at which the cameras 11 and 12 are attached, from a road surface is set as an "attachment height H" (camera height), and an angle from a horizontal surface when the cameras 11 and 12 are attached so as to face downward is set as a "depression angle β". Further, a horizontal view angle and a vertical view angle of the cameras 11 and 12 are set as $\theta_H$ and $\theta_V$, respectively.

When the "horizontal view angle $\theta_H$" and the "vertical view angle $\theta_V$" of the cameras 11 and 12 are too large, an obstacle or a step appears small, so that accuracy is deteriorated, but to the contrary, when the "horizontal view angle $\theta_H$" and the "vertical view angle $\theta_V$" are too small, a range where an obstacle or a step is able to be detected becomes narrow, so that setting needs to be performed appropriately. Moreover, the "depression angle β" is set so that vicinity of a mobility scooter or an electric-powered wheelchair falls within a view field.

The two cameras 11 and 12 are attached to be separated laterally in FIG. 2 and FIG. 3, but may be attached to be separated vertically or obliquely. Though description will be given below for an example where the two cameras 11 and 12 are attached to be separated laterally, the same is applied basically even in the case of being vertically or obliquely.

Figure 4:
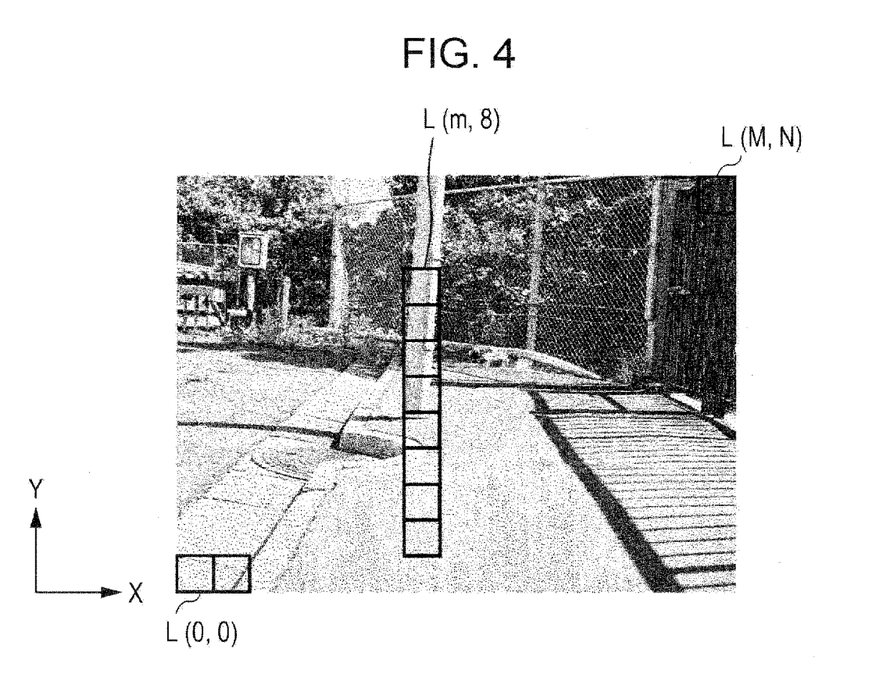
FIG. 4 is a view showing one example of a left image (first image) of stereo images captured by the aforementioned camera unit.
Figure 5:
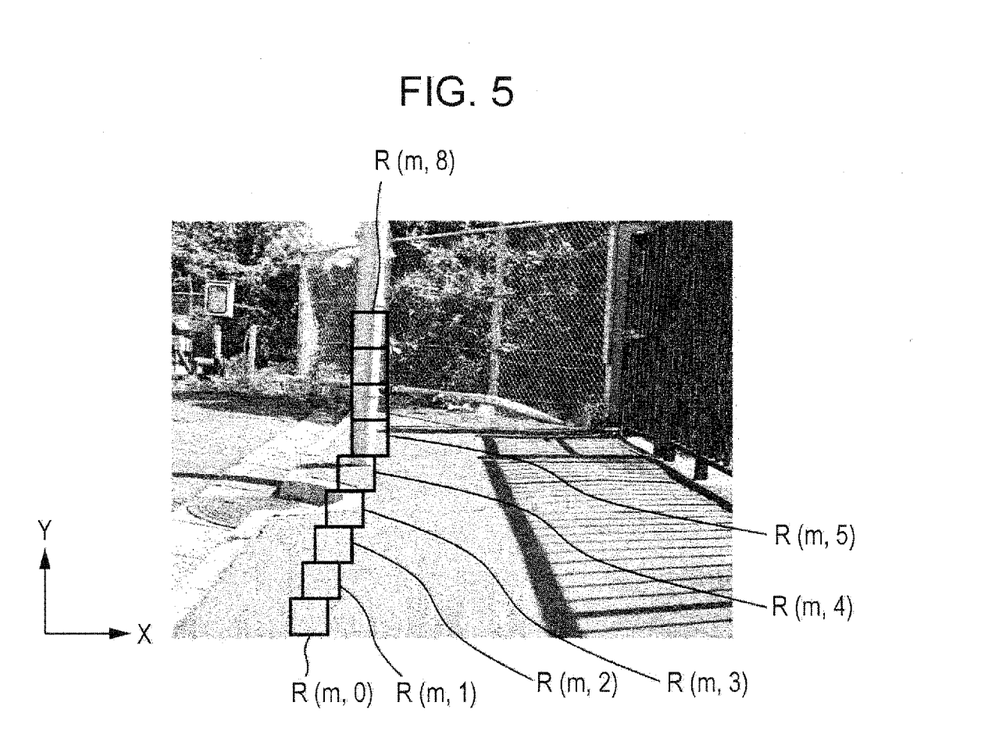
FIG. 5 is a view showing one example of a right image (second image) of the aforementioned stereo images.

FIG. 4 and FIG. 5 show one example of left and right images photographed by the two cameras 11 and 12 (shown in FIG. 2 and FIG. 3). Since the cameras 11 and 12 are separated laterally, the camera 11 on a left side when facing an object and the camera 12 on a right side when facing the object have different images. It is a first aim to divide a left image (first image) captured by the camera 11 on the left side into a plurality of blocks arrayed in a matrix shape and to obtain where an image which appears in each of the blocks appears in a right image (second image) captured by the camera 12 on the right side.

A size of the block obtained by dividing the aforementioned left image (first image) may be an arbitrary size, but when being too small, it becomes more likely to make mistake as a similar different place and accuracy is deteriorated. To the contrary, when the size of the block is too large, a plurality of objects which are at different distances in the block appear in some cases, which also causes deterioration of accuracy. In the case of an image size of 640×480, it is appropriate to set as about 64×32 pixels or 32×32 pixels.

Here, the left image (first image) is divided into a plurality of blocks arrayed in a matrix shape of N rows (N is an integer of 2 or more) and M columns (M is an integer of 2 or more).

As shown in FIG. 4 and FIG. 5, the left image (first image) shown in FIG. 4 has a lower left block as L (0, 0) and a block at a position rightward by m pieces (m=0, 1, 2, . . . , M) and upward by n pieces (n=0, 1, 2, . . . , N) as a block L (m, n). A rectangular region of the right image (second image) shown in FIG. 5 in which an object same as or similar to an object appearing in this block L (m, n) of the left image (first image) is set as a corresponding block R (m, n).

In this embodiment, an XY-coordinate of the corresponding block of the right image (second image) shown in FIG. 5 is obtained with the left image (first image) shown in FIG. 4 as a reference, but to the contrary, the XY-coordinate of the corresponding block may be obtained with the right image as the reference first image and the left image as the second image.

Note that, lateral directions of the aforementioned first and second images are set as X-coordinates and vertical directions of the first and second images are set as Y-coordinates. Moreover, the XY-coordinate indicating a position of each block of the first and second images may be a coordinate at a center position of a rectangular block, a coordinate of a lower left corner portion of the rectangular block, or the like.

Then, a left and right pair of images (stereo images) shown in FIG. 4 and FIG. 5 are sent to the computation unit 2 shown in FIG. 1.

Figure 6:
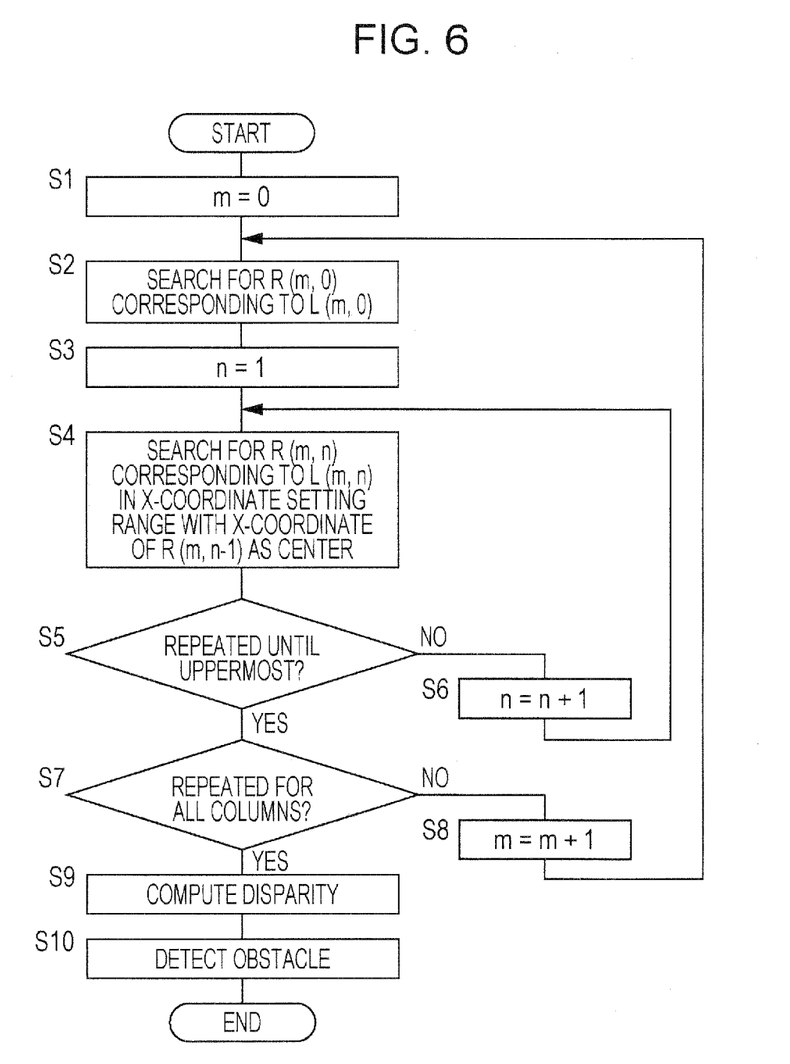
FIG. 6 is a flowchart for explaining operation of a computation unit of the aforementioned obstacle detection device.

FIG. 6 is a flowchart for explaining operation of processing of the computation unit 2 shown in FIG. 1, and a corresponding block of the right image (second image)

corresponding to each block of the left image (first image) is searched for and disparity is computed. Here, the disparity computation unit 21 executes steps S1 to S9 in turn for each of m columns from 0 to M of the left image (first image) of FIG. 4.

[Step S1]

It is set that m=0.

[Step S2] (First Step of Disparity Computation Step)

Next, with respect to a bottom block L (m, 0) in an m-th column of the left image (first image), a corresponding block R (m, 0) of the right image (second image) in which a same or similar object appears is searched for.

Here, since the left and right images (first and second images) photographed by the stereo camera (cameras 11 and 12) are shifted only in a lateral direction, a Y-coordinate of the corresponding block R (m, 0) is same as a Y-coordinate of the block L (m, 0). Thus, only an X-coordinate of the corresponding block R (m, 0) may be obtained. For this purpose, a block at a position of each X-coordinate of a zeroth row of the right image (second image) is cut out to be compared with the block L (m, 0), and the corresponding block of the right image (second image) whose image is most similar is found.

For comparison of the blocks of the left image (first image) and the right image (second image), there are a method for comparing pixel values for each point in the left and right blocks to take a sum of absolute values thereof and the like, but any method may be used.

[Step S3]

Next, it is set that n=1.

[Step S4] (Second Step of Disparity Computation Step)

Next, the corresponding block R (m, n) corresponding to the block L (m, n) is searched for in an X-coordinate setting range with an X-coordinate of the corresponding block R (m, 0) as a center.

At this time, a Y-coordinate of the corresponding block R (m, n) is same as a Y-coordinate of the block L (m, n). Further, as a X-coordinate of the corresponding block R (m, n), a vicinity of a X-coordinate of a corresponding block R (m, n−1) obtained at step S1 may be searched for, and the search is performed in a predetermined X-coordinate setting range with the X-coordinate of the corresponding block R (m, n−1) corresponding to a block L (m, n−1) which has been searched for as a center in the present embodiment.

Since lower parts of the left and right images are near a mobility scooter or an electric-powered wheelchair, the road surface (including a floor surface) appears therein, but a distance to the road surface changes continuously, so that the X-coordinates of the corresponding block R (m, 0) and the corresponding block R (m, 1) do not change largely. Thus, for example, searching a range of ±16 pixels is enough in the case of an image with 640×480 pixels.

Moreover, since the road surface appears from the corresponding block R (m, 0) to a corresponding block R (m, 4) in FIG. 5, the X-coordinate changes gradually. Though an obstacle appears upward from a corresponding block R (m, 5), disparity of the obstacle is equal to disparity of the road surface at a position where the obstacle makes contact with the road surface, so that disparity becomes able to be computed only by searching a limited range regardless of whether disparity of the left and right images (first and second images) of the obstacle is large or small.

[Step S5]

Whether or not to be repeated until uppermost is judged for the m-th column (whether or not n=N is judged). Then, when it is judged as not being repeated until uppermost (n<N), the flow goes to step S6, while it is judged as being repeated until uppermost (n=N), the flow goes to step S7.

[Step S6]

After incrementing n and returning to step S4, steps S4 and S5 are repeated.

[Step S7]

Whether or not to be repeated is judged for all columns (whether or not m=M is judged). Then, when it is judged as not being repeated for all the columns (m<M), the flow goes to step S8, while it is judged as being repeated for all the columns (m=M), this processing ends.

[Step S8]

After incrementing m and returning to step S2, steps S2 to S8 are repeated.

Accordingly, the XY-coordinate of the corresponding block R (m, n) of the corresponding right image (second image) is found for each block L (m, n) of the left image (first image).

[Step S9] (Third Step of Disparity Computation Step)

Next, disparity of each block of the left and right images (first and second images) is computed. This disparity of each block of the left and right images (first and second images) is computed as a difference between an X-coordinate of L (m, n) and the X-coordinate of R (m, n). A relation between the disparity of an object and a distance to the object is a simple proportional relation, and a proportionality coefficient is obtained from a view angle and a pixel number of a camera, but the proportionality coefficient may be obtained by actually measuring the relation between the disparity of the object and the distance to the object.

[Step S10] (Obstacle Detection Step)

Then, the distance to the object is obtained by the obstacle detection unit 22 based on the disparity of each block of the left and right images (first and second images), which is computed by the disparity computation unit 21 at step S9, and whether or not the object is an obstacle is detected.

Though processing is performed one column by one column in an obstacle detection method shown in the flowchart of FIG. 6, processing may be performed one row by one row in such manner that processing is performed for an entire lower row and processing is then performed for an upper row in order.

Figure 7:
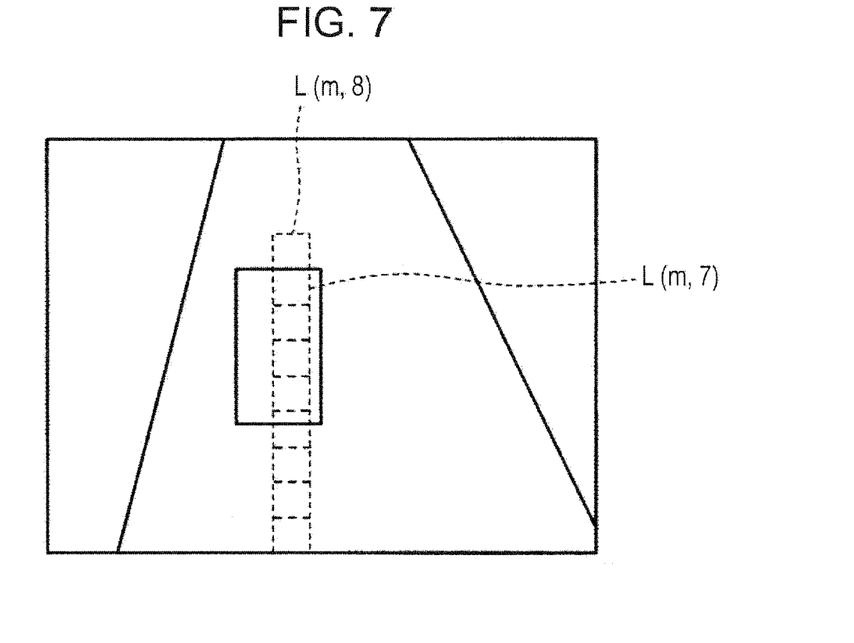
FIG. 7 is a view showing one example of a first image of a small obstacle.
Figure 8:
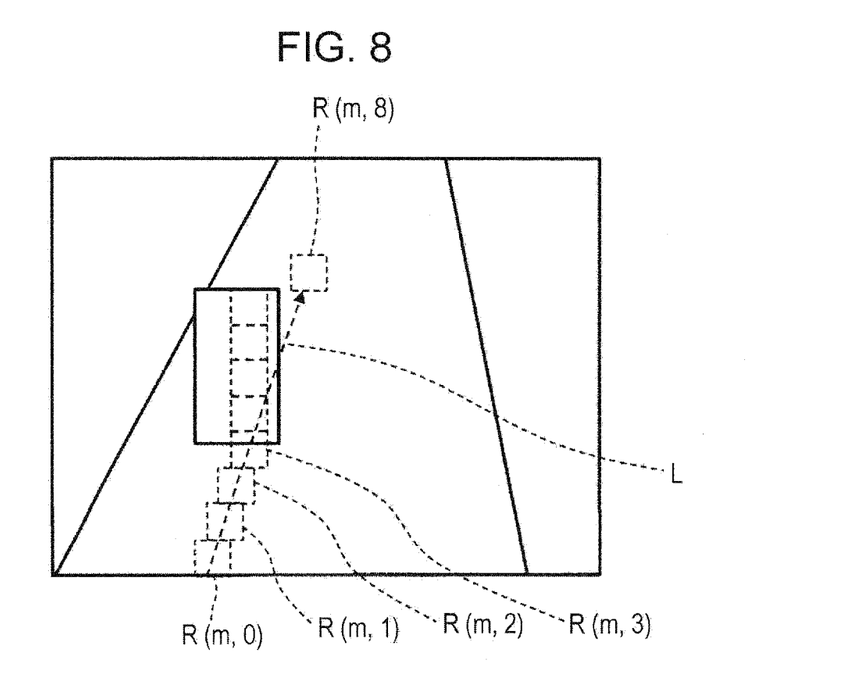
FIG. 8 is a view showing one example of a second image of the small obstacle.

In a case where there is a low-height obstacle as shown in FIG. 7 and FIG. 8, when a corresponding block R (m, 8) of a right image (second image) shown in FIG. 8 corresponding to a block L (m, 8) above the obstacle of a left image (first image) shown in FIG. 7 is searched for, a corresponding place is not found in some cases even by searching a vicinity of an X-coordinate same as an X-coordinate of a block L (m, 7). At this time, since the obstacle has been already found in a front side, it is not particularly necessary to detect an obstacle in a depth side therefrom, so that the search may be terminated.

If it is desired to find the corresponding block R (m, 8) correctly, however, when the R (m, 8) is the road surface, the correct corresponding block R (m, 8) is able to be found by searching on an extended line L of the X-coordinates of the corresponding blocks R (m, 0) to R (m, 4) which are the road surface in the same manner. As to whether the corresponding blocks R (m, 0) to R (m, 4) are the road surface, when the X-coordinates thereof are on a straight line with constant inclination, it is possible to estimate that they are on the road surface.

According to the obstacle detection device and the obstacle detection method with the aforementioned configuration, by the disparity computation unit 21, first, with respect to a block in a bottom row of a left image (first image), a corresponding block within a second image which has a same Y-coordinate as a Y-coordinate of the block and in which an object same as or similar to an object appearing in the block appears is searched for, and, next, in the case of searching for, with respect to a block which is upward in order from the searched block of the left image (first image), a corresponding block within the right image (second image) in which an object same as or similar to that of the block appears, the corresponding block within the right image (second image) which has a same Y-coordinate as a Y-coordinate of the block of the left image (first image) and in which an object same as or similar to that of the block of the left image (first image) appears in an X-coordinate setting range with an X-coordinate of the corresponding block of the right image (second image) corresponding to the searched block which is immediately below the block of the left image (first image) as a center is searched for, thus making it possible to simplify processing for finding an obstacle, and to shorten a processing time as well as simplify a hardware configuration.

[Second Embodiment]

Moreover, an obstacle detection device of a second embodiment of this invention has a same configuration as that of the obstacle detection device of the first embodiment except for operation of the disparity computation unit 21, and FIG. 1 is cited.

At step S2 shown in FIG. 6 of the aforementioned first embodiment, the corresponding block R (m, 0) is searched for with respect to all the X-coordinates of the right image (second image), but approximate disparity is computed from a depression angle and height for attachment and a vertical view angle of the cameras 11 and 12 and a vicinity thereof is searched in the obstacle detection device of this second embodiment.

Figure 9:
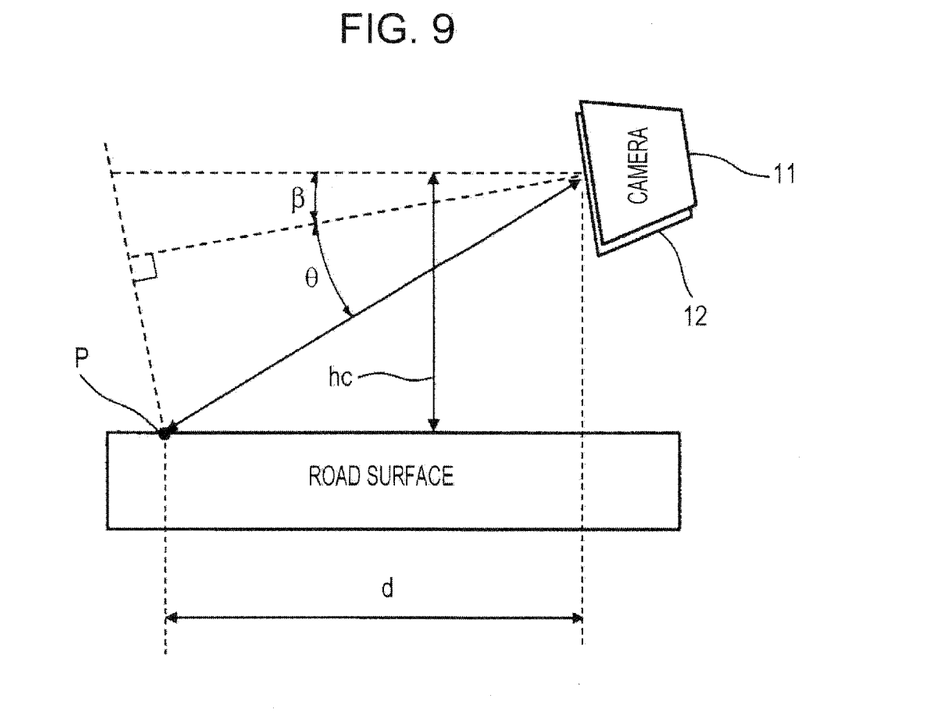
FIG. 9 is a view for explaining a distance computation method of an obstacle detection device of a second embodiment of this invention.

Specifically, as shown in FIG. 9, when a half of the vertical view angle of the cameras 11 and 12 is θ, the depression angle of the cameras 11 and 12 is β and the camera height is hc, a distance d to the road surface (point P) which appears in the bottom of a screen is expressed by $d=hc/\sin(\beta+\theta)$.

Then, by computing disparity of the left and right images (first and second images) based on the aforementioned distance d to the road surface (point P) and searching an X-coordinate setting range (for example, ±16 pixels) in a vicinity of a coordinate obtained by subtracting the disparity from the X-coordinate of the block L (m, 0), it is possible to obtain the coordinate of the corresponding block R (m, 0) in a short time.

The obstacle detection device of the aforementioned second embodiment has a same effect as that of the obstacle detection device of the first embodiment.

[Third Embodiment]

Moreover, an obstacle detection device of a third embodiment of this invention has a same configuration as that of the obstacle detection device of the first embodiment except for attachment directions of the cameras 11 and 12, and operation of the disparity computation unit 21, and FIG. 1 is cited.

In the obstacle detection device of this third embodiment, the attachment directions of the respective cameras 11 and 12 are changed, but arrangement directions of the cameras 11 and 12 are not changed in a lateral direction.

Figure 10A:
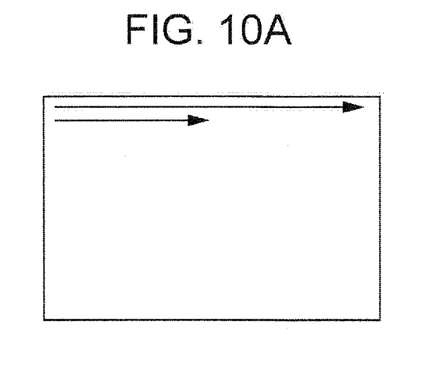
FIG. 10A is a schematic view showing transfer order of image data captured by a camera unit of an obstacle detection device of a third embodiment of this invention.

A normal camera is set so as to transfer data from upper to lower rows one row by one row from an upper left end to an upper right end of a screen as shown in FIG. 10A.

Thus, when performing processing of disparity computation sequentially from a block in a lower row like in the obstacle detection device of the aforementioned first embodiment, processing is able to be started only after all images of one screen are stored in a memory.

Figure 10B:
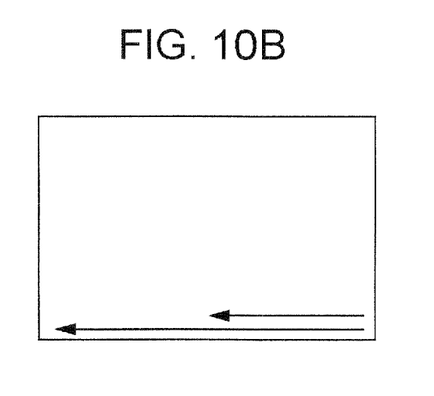
FIG. 10B is a schematic view showing transfer order of image data captured by the camera unit of the aforementioned obstacle detection device.

Against this, in the obstacle detection device of this third embodiment, when each of the cameras 11 and 12 is attached by rotating by 180 degrees in a clockwise direction along a plane at a right angle to an optical axis, image data is transferred from the cameras 11 and 12 to the disparity computation unit 21 sequentially one row by one row upwardly first from lower right to a lower left of one row of a screen as shown in FIG. 10B. Thereby, as soon as image data of blocks in lower rows of the left and right images (first and second images) is prepared, processing of disparity computation becomes possible to be started sequentially.

With the aforementioned configuration where the left and right images (first and second images) are transferred one row by one row upwardly from a lower row from the cameras 11 and 12 to the disparity computation unit 21, a corresponding block of the right image (second image) is able to be searched for in series in accordance with transferring of image data and a time for detecting an obstacle is able to be shortened.

Figure 10C:
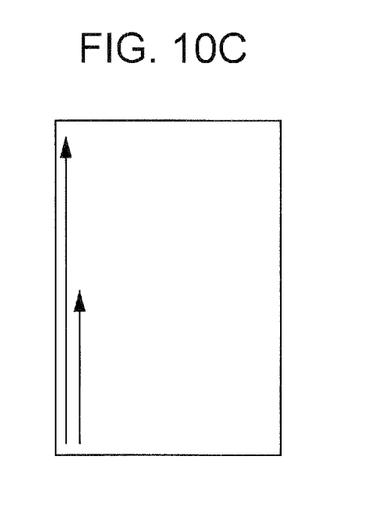
FIG. 10C is a schematic view showing transfer order of image data captured by the camera unit of the aforementioned obstacle detection device.
Figure 10D:
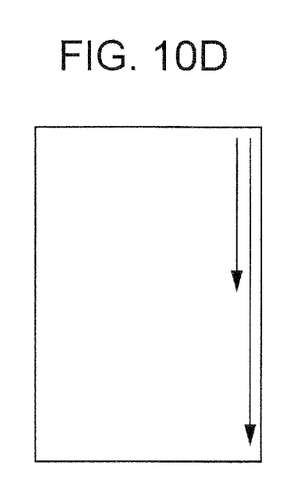
FIG. 10D is a schematic view showing transfer order of image data captured by the camera unit of the aforementioned obstacle detection device.

In addition, when the cameras 11 and 12 are attached by rotating 90 degrees in a counterclockwise direction, it is also possible to transfer data one column by one column in a left-to-right direction of the image as shown in FIG. 10C. Moreover, when the cameras 11 and 12 are attached by rotating 90 degrees in a clockwise direction, it is also possible to transfer data one column by one column in a right-to-left direction of the image as shown in FIG. 10D. In this case, as soon as image data of blocks of one column on the left or right is prepared, processing becomes possible to be started.

With the aforementioned configuration where the left and right images (first and second images) are transferred one column by one column leftward from a right column or one column by one column rightward from a left column from the cameras 11 and 12 to the disparity computation unit 21, a corresponding block of the right image (second image) is able to be searched for in series in accordance with transferring of image data and a time for detecting an obstacle is able to be shortened.

The obstacle detection device of the aforementioned third embodiment has a same effect as that of the obstacle detection device of the first embodiment.

Though description has been given for the obstacle detection device used for a mobility scooter or an electric-powered wheelchair in the aforementioned first to third embodiments, the obstacle detection device may be applied to other means of transportation such as a delivery vehicle.

Though description has been given for specific embodiments of this invention, this invention is not limited to the aforementioned first to third embodiments and can be carried out by variously modifying within a scope of this invention.

An obstacle detection device of this invention includes:

a stereo camera (11, 12);

a disparity computation unit 21 that computes, based on a first image and a second image photographed by the stereo camera (11, 12), disparity of an object appearing in the first and second images; and an obstacle detection unit 22 that obtains a distance to the object based on the disparity of the object appearing in the first and second images, which is computed by the disparity computation unit 21, to detect whether or not the object is an obstacle, in which lateral directions of the first and second images are set as X-coordinates and vertical directions of the first and second images are set as Y-coordinates, as well as the first image is divided into a plurality of blocks that are arrayed in a matrix shape, and the disparity computation unit 21 searches for, with respect to a block in a bottom row of the first image, a corresponding block within the second image which has a same Y-coordinate as a Y-coordinate of the block and in which an object same as or similar to an object appearing in the block appears, next, in the case of searching for, with respect to a block which is upward in order from the searched block of the first image, a corresponding block within the second image in which an object same as or similar to that of the block appears, searches for the corresponding block within the second image which has a same Y-coordinate as a Y-coordinate of the block of the first image and in which an object same as or similar to that of the block of the first image appears in an X-coordinate setting range with an X-coordinate of the corresponding block of the second image corresponding to the searched block which is immediately below the block of the first image as a center, and computes disparity of the object appearing in the first and second images from a difference between an X-coordinate of the block of the first image and the X-coordinate of the corresponding block of the second image corresponding to the block.

Here, in the plurality of blocks of the first image which are arrayed in the matrix shape, a plurality of blocks which are arranged in a lateral direction are set as one row and a plurality of blocks which are arranged in a vertical direction are set as one column.

With the aforementioned configuration, it is possible to simplify processing for finding an obstacle, and to shorten a processing time and simplify a hardware configuration.

Moreover, in the obstacle detection device of one embodiment, the disparity computation unit 21 computes a distance to a road surface which appears in the block in the bottom row of the first image based on a vertical view angle, a depression angle and a camera height of the stereo camera, computes disparity between the road surface which appears in the block in the bottom row of the first image and the road surface which is to appear in the second image based on the distance to the road surface which appears in the block in the bottom row of the first image, and searches for a corresponding block within the second image which has a Y-coordinate same as the Y-coordinate of the block in the bottom row of the first image and in which an object same as or similar to that of the block of the first image appears in the X-coordinate setting range with an X-coordinate obtained by subtracting the disparity from an X-coordinate of the block as a center.

According to the aforementioned embodiment, the disparity between the road surface which appears in the block in the bottom row of the first image and the road surface which is to appear in the second image is able to be computed easily and an obstacle is able to be detected in a shorter time.

Moreover, in the obstacle detection device of one embodiment, data of the first and second images is transferred one row by one row upwardly from a lower row from the stereo camera (11, 12) to the disparity computation unit 21, and the disparity computation unit 21, at a time when image data included in a block of one row of the first image and image data of the second image corresponding to the image data are prepared, searches for a corresponding block of the second image in which an object same as or similar to an object appearing in the block of the first image appears.

According to the aforementioned embodiment, in the configuration where the data of the first and second images is transferred one row by one row upwardly from the lower row from the stereo camera (11, 12) to the disparity computation unit 21, it is possible to search for the corresponding block of the second image sequentially in accordance with transferring of the image data and to shorten a time for detecting an obstacle.

Moreover, in the obstacle detection device of one embodiment, data of the first and second images is transferred one column by one column in a leftward manner from a right column or one column by one column in a rightward manner from a left column from the stereo camera (11, 12) to the disparity computation unit 21, and the disparity computation unit 21, at a time when image data included in blocks of a plurality of columns of the first image and image data of the second image corresponding to the image data are prepared, searches for a corresponding block of the second image in which an object same as or similar to an object appearing in the block of the first image appears.

According to the aforementioned embodiment, in the configuration where the data of the first and second images is transferred one column by one column in the leftward manner from the right column or one column by one column in the rightward manner from the left column from the stereo camera (11, 12) to the disparity computation unit 21, it is possible to search for the corresponding block of the second image sequentially in accordance with transferring of the image data and to shorten a time for detecting an obstacle.

Moreover, an obstacle detection method of this invention is an obstacle detection method having:

a disparity computation step of computing, based on two of a first image and a second image having disparity, which are photographed by a stereo camera (11, 12), disparity of an object appearing in the first and second images by a disparity computation unit 21; and an obstacle detection step of obtaining a distance to the object based on the disparity of the object appearing in the first and second images, which is computed at the disparity computation step, to detect whether or not the object is an obstacle by an obstacle detection unit 22, in which lateral directions of the first and second images are set as X-coordinates and vertical directions of the first and second images are set as Y-coordinates, as well as the first image is divided into a plurality of blocks that are arrayed in a matrix shape, and the disparity computation step includes:

a first step of searching for, with respect to a block in a bottom row of the first image, a corresponding block within the second image which has a same Y-coordinate as a Y-coordinate of the block and in which an object same as or similar to an object appearing in the block appears, a second step of, next, in the case of searching for, with respect to a block which is upward in order from the searched block of the first image, a corresponding block within the second image in which an object same as or similar to that of the block appears, searching for the corresponding block within the second image which has a same Y-coordinate as a Y-coordinate of the block of the first image and in which an object same as or similar to that of the block of the first image appears in an X-coordinate setting range with an X-coordinate of the corresponding block of the second image corresponding to the searched block which is immediately below the block of the first image as a center, and a third step of computing disparity of the object appearing in the first and second images from a difference between an X-coordinate of the block of the first image and the X-coordinate of the corresponding block of the second image corresponding to the block, which are obtained at the first and second steps.

With the aforementioned configuration, it is possible to simplify processing for finding an obstacle and to shorten a processing time and simplify a hardware configuration.

REFERENCE SIGNS LIST 1 camera unit
2 computation unit
3 output device
11, 12 camera
21 disparity computation unit
22 obstacle detection unit

The invention claimed is:

1. An obstacle detection device, comprising:
a stereo camera;
disparity computation processing hardware that computes, based on a first image and a second image photographed by the stereo camera, disparity of an object appearing in the first and second images; and
obstacle detection processing hardware that obtains a distance to the object based on the disparity of the object, which is computed by the disparity computation processing hardware, to detect whether or not the object is an obstacle, wherein
lateral directions of the first and second images are set as X-coordinates and vertical directions of the first and second images are set as Y-coordinates,
the first image is divided into a plurality of blocks that are arrayed in a matrix shape, and
the disparity computation processing hardware:
searches for, with respect to a first block of the plurality of blocks in a bottom row of the first image, a first corresponding block within the second image which has a same Y-coordinate as a Y-coordinate as the first block and in which the object appearing in the first block appears,
searches for, with respect to a second block of the plurality of blocks that is upward from the first block, a second corresponding block within the second image in which the object appears, and searches for the second corresponding bock within the second image which has a same Y-coordinate as a Y-coordinate of the second block in which the object appears in an X-coordinate setting range with an X-coordinate of the second corresponding block of the second image corresponding to the first block which is immediately below the second block of the first image as a center,
computes disparity of the object as it appears in the first and second images from a difference between an X-coordinate of the first block and the X-coordinate of the first corresponding block,
computes a distance to a road surface in the first block based on a vertical view angle, a depression angle, and a camera height of the stereo camera,
computes disparity between the road surface in the first block and the road surface in the second image based on the distance to the road surface, and
searches for a corresponding block within the second image which has a same Y-coordinate as a Y-coordinate of the first block and in which the object appears in the X-coordinate setting range with an X-coordinate range obtained by subtracting the display from an X-coordinate of the first block as a center.

2. An obstacle detection device, comprising:
a stereo camera;
disparity computation processing hardware that computes, based on a first image and a second image photographed by the stereo camera, disparity of an object appearing in the first and second images; and
obstacle detection processing hardware that obtains a distance to the object based on the disparity of the object, which is computed by the disparity computation processing hardware, to detect whether or not the object is an obstacle, wherein
lateral direction of the first and second images are set as X-coordinates and vertical directions of the first and second images are set as Y-coordinates,
the first image is divided into a plurality of blocks that are arrayed in a matrix shape, and
the disparity computation processing hardware:
searches for, with respect to a first block of the plurality of blocks in a bottom row of the first image, a first corresponding block within the second image which has a same Y-coordinate as a Y-coordinate as the first block and in which the object appearing in the first block appears,
searches for, with respect to a second block of the plurality of blocks that is upward from the first block, a second corresponding block within the second image in which the object appears, and searches for the second corresponding block within the second image which has the same Y-coordinate as a Y-coordinate of the second block in which the object appears in an X-coordinate setting range with an X-coordinate of the second corresponding block of the second image corresponding to the first block which is immediately below the second block of the first images a center, and
computes disparity of the object as it appears in the first and second images from a difference between an X-coordinate of the first block and the X-coordinate of the first corresponding block,
data of the first and second images is transferred one row by one row upwardly from a lower row from the stereo camera to the disparity computation processing hardware, and
the disparity computation processing hardware, at a time when image data included in a block of one row of the first image and image data of the second image corresponding to the image data are prepared, searches for a corresponding block of the second image in which the object appears.

3. An obstacle detection device, comprising:
a stereo camera;
disparity computation processing hardware that computes, based on a first image and a second image photographed by the stereo camera, disparity of an object appearing in the first and second images; and
obstacle detection processing hardware that obtains a distance to the object based on the disparity of the object, which is computed by the disparity computation processing hardware, to detect whether or not the object is an obstacle, wherein lateral direction of the first and second images are set as X-coordinates and vertical directions of the first and second images are set as Y-coordinates, the first image is divided into a plurality of blocks that are arrayed in a matrix shape, and the disparity computation processing hardware:

searches for, with respect to a first block of the plurality of blocks in a bottom row of the first image, a first corresponding block within the second image which has a same Y-coordinate as a Y-coordinate as the first block and in which the object appearing in the first block appears, searches for, with respect to a second block of the plurality of blocks that is upward from the first block, a second corresponding block within the second image in which the object appears, and searches for the second corresponding block within the second image which has a same Y-coordinate as a Y-coordinate of the second block in which the object appears in an X-coordinate setting range with an X-coordinate of the second corresponding block of the second image corresponding to the first block which is immediately below the second block of the first image as a center, and computes disparity of the object as it appears in the first and second images from a difference between an X-coordinate of the first block and the X-coordinate of the first corresponding block, data of the first and second images is transferred one column by one column in a leftward manner from a right column or one column by one column in a rightward manner from a left column from the stereo camera to the disparity computation processing hardware, and the disparity computation processing hardware, at a time when image data included in a plurality of blocks of a plurality of columns of the first image and second image data of the second image corresponding to the first image data are prepared, searches for a corresponding block of the second image in which the object appears.

* * * * *